Nov. 15, 1949 A. TREVENA 2,487,994
LATHE OR OTHER TURNING MACHINES
Filed Dec. 8, 1945 2 Sheets-Sheet 1
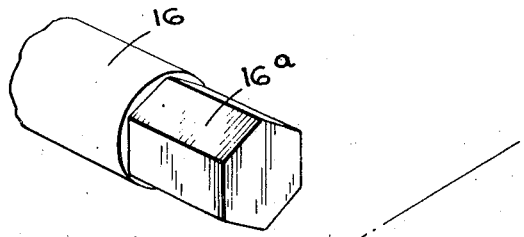
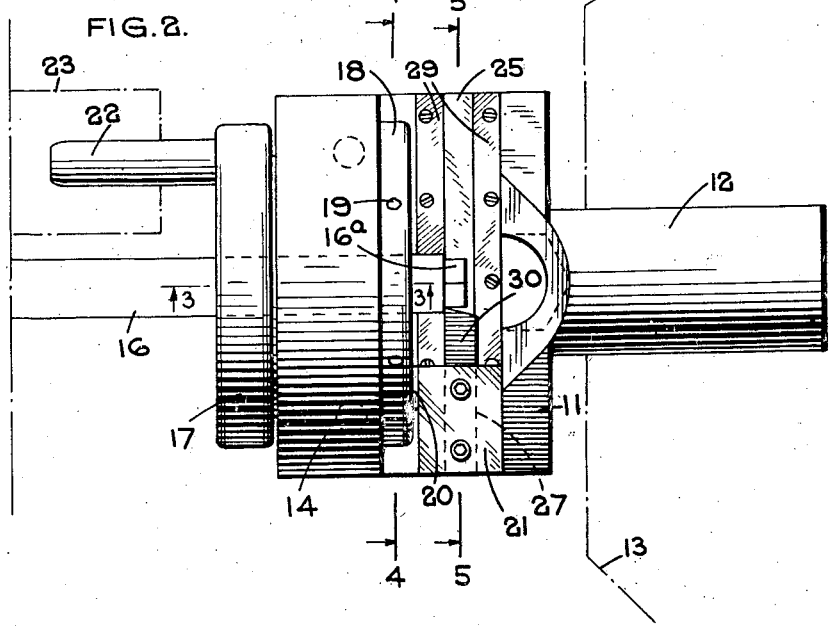
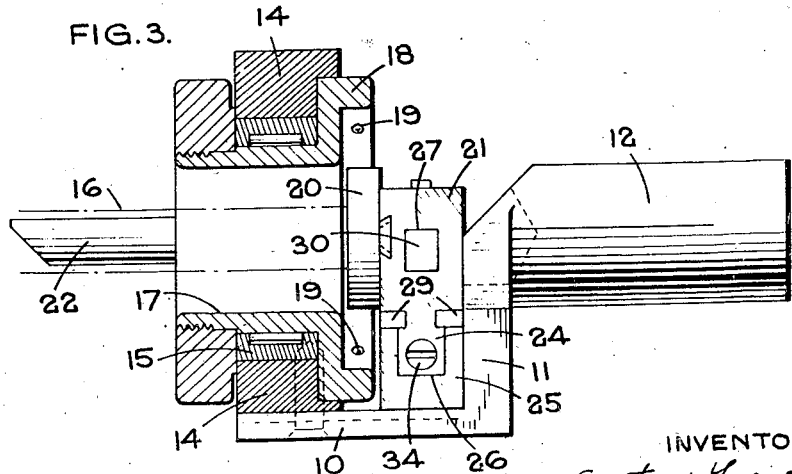
INVENTOR
Arthur Trevena
BY
his ATTORNEY.

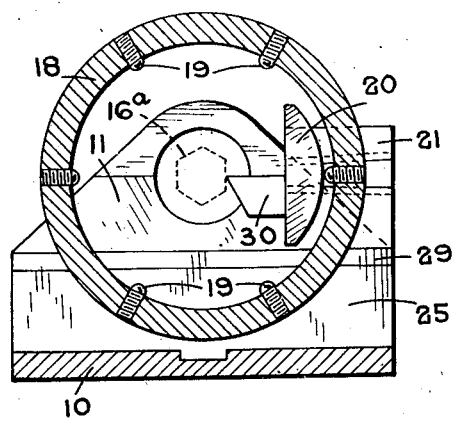
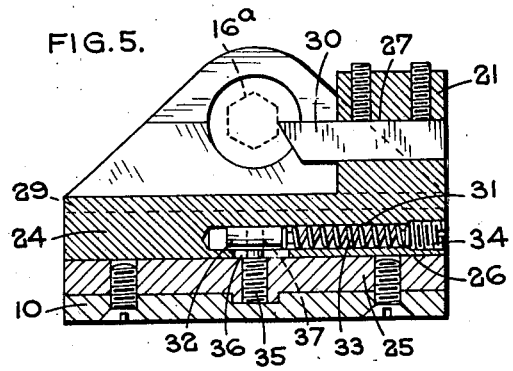
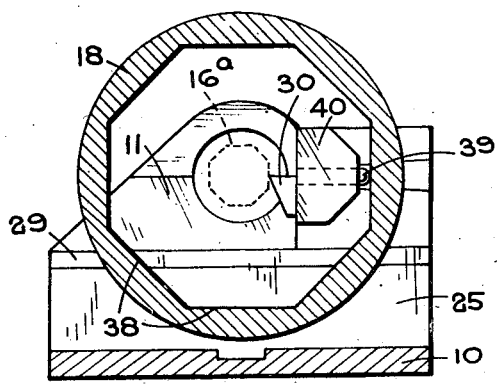

Patented Nov. 15, 1949

2,487,994

UNITED STATES PATENT OFFICE 2,487,994

LATHE OR OTHER TURNING MACHINES

Arthur Trevena. Olton, Birmingham, England, assignor to J. Brockhouse & Company, Limited, West Bromwich, England, a British company Application December 8, 1945, Serial No. 633,591
In Great Britain August 3, 1944

Section 1, Public Law 690, August 8, 1946
Patent expires August 3, 1964

5 Claims. (Cl. 82—19)

This invention relates to lathes and other turning machines, hereinafter referred to and included in the generic expression "machine tool," and the invention is particularly applicable to machine tools of the kind wherein the work is rotated about its own axis and is operated upon in turn by a plurality of tools mounted upon a common tool carrier which serves to present them successively to the rotating work, the tools being themselves held against rotation around the axis of the work. Machine tools produce on the work a surface which is of circular cross section. It is often necessary to produce on a work-piece portions of circular cross section and another portion or other portions of non-circular cross section such for instance as hexagonal, square or octagonal and in such case it has hitherto been necessary to take the work out of the machine used for producing the surface or surfaces of circular cross section and re-set the work in another machine for producing the part or parts of non-circular cross section.

The primary object of the present invention is to provide means whereby without re-setting the work, surfaces thereon can be produced, one at least of which is of circular cross section and another at least of which is of non-circular cross section.

A further object of the invention is to provide a new or improved form of tool holder for producing on the work surfaces of non-circular cross section, and which is readily adaptable to work of varying forms.

Other objects of the invention will be apparent from the following description and the drawings accompanying same.

Referring to the drawings:

Figure 1 is a perspective view of part of a work-piece such as can be produced by the means hereinafter described.

Figure 2 is a side elevation of one form of tool holder embodying the present invention, and Figure 3 is a part sectional view on the line 3—3 of Figure 2.

Figures 4 and 5 are transverse sections on the lines 4—4 and 5—5, respectively, of Figure 2, and Figure 6 is a view corresponding to Figure 4, but showing an alternative construction.

The present invention is particularly applicable to lathes of the capstan type, and in the construction illustrated in Figures 2 to 5 as applied to such a machine, the body 10 of the tool holder is of approximately U shape, one limb 11 thereof being provided with a spigot 12 which can be secured in the capstan head 13 and the other limb 14 being provided with a bearing 15 which is concentric with the work-piece 16, this bearing carrying a sleeve 17 which is formed or provided with a ring 18 having a number of inwardly projecting hardened and rounded pins or abutments 19 adapted to co-operate with a cam 20 secured to the tool supporting element 21.

The sleeve 17 associated with the ring 18 is provided with a pin 22 projecting parallel to its axis but offset therefrom, and this pin is adapted to engage with a member 23 provided on the rotating head of the machine which carries the work-piece 16.

The ring 18 having the abutments 19 thereon is thus rotated at the same rate as the work-piece 16.

The tool supporting element 21 is mounted on the U shaped body 10 for sliding movement transversely to the axis of the work-piece 16 and sleeve 17. A shank 24 provided on the supporting element 21 slides in a guide member 25 carried by the body 10. Conveniently the shank 24 has a portion of rectangular section engaging in a groove 26 in the guide member 25 and between such portion and the tool socket 27 is a neck 28 of reduced width which is engaged by two plates 29 secured to the edges of the groove 26.

The guide groove 26 extends at right angles to the axis of the work-piece 16 and sleeve 17, so that the tool supporting element 21 is constrained to slide in a direction towards and away from such axis, carrying with it a suitable tool 30 mounted in the socket 27.

The cam 20 carried by the tool supporting element extends laterally therefrom into the plane of the ring 18, and is of suitable shape for engagement by the rounded abutments 19 projecting internally of the ring 18. The operative profile of the cam 20 may be of arcuate form, with a smaller radius than the interior of the ring 18, so that as each abutment 19 slides over the cam profile the tool supporting element 21 is displaced inwardly towards the axis of rotation.

Drilled longitudinally of the shank 24 of the tool supporting element 21 is a blind hole 31 containing a plug 32, a compression spring 33 being engaged between the latter and a second plug 34 screwed into the mouth of the hole. A grub screw 35 carried by the portion 25 of the tool holder body 10 extends through a longitudinal slot 36 in the holder shank 24 into a diametral hole 37 in the plug 32 so that the latter is fixed in relation to the body 10 and the spring 33 operates to return the supporting element 21 after each inward movement thereof by the abutments 19.

The cam 20 may be designed so that the inwardly and outwardly moving tool 30 will produce flats on the work-piece 16, and thereby enable a portion 16a of the latter to be machined to hexagonal or other polygonal section as shown.

If desired, the cam profile may be such that the corners between the various faces of the polygonal section are bevelled or rouded off by the tool 30.

Alternatively, a succession of surfaces which are either concave or convex may be produced by the cam 20, or the latter may be designed for producing non-circular sections other than polygonal, as for instance, when it is desired to turn a portion of the work-piece elliptical section.

Figure 6 illustrates a modified construction in which, instead of a cam on the tool supporting element 21 being engaged by a plurality of abutments on the ring 18, the latter is provided with a plurality of cam faces 38 for co-operation with a single abutment 39 on the supporting element 21.

This abutment 39, or the abutments 19 of the preceding construction, may be replaced by small rollers, if desired.

In the first construction, the non-circular section produced on the work-piece 16 is dependent upon the number of abutments 19 and the profile of the cam 20, whilst in Figure 6 the determining factors are the number and form of the cam surfaces 38.

To enable a single tool holder to be used for producing a variety of different sections, the sleeve 18 is made detachable from the body 10, and the cam 20 (or a block 40 carrying the single abutment 39) is made detachable from the tool supporting element 21.

It will be understood that a tool holder constructed as above described operates equally well when the work-piece 16 is held stationary and the shank 12 of the body 10 is engaged by the rotating head of the machine.

The body 10 of the tool holder need not necessarily be of U shape as shown. For example, it may be cylindrical, in which case the part 11 may be represented by a complete annular web connecting one end of the cylinder to the spigot 12, the part 14 also being of annular form and fitting into the other end of the cylinder.

What I claim then is:

1. In a machine tool of the kind specified, a tool holder comprising a body having a pair of conected parts spaced apart along the axis of rotation of the work, one of said body parts being mounted detachably and non-rotatably on said tool carrier, the other of said body parts having an opening therein, a ring mounted in said opening for rotation about the axis of the work, a driver operably associated with said ring and projecting outwardly of said body parallel to but offset from the work axis, a tool supporting element disposed between said body parts and mounted slidably on said body for oscillatory movement towards and away from the axis of the work, said element being adapted detachably to carry a tool disposed between said body parts, a follower operably associated with said tool supporting element, and extending into the interior of the ring at one side of said work axis, said ring being provided internally with a plurality of angularly disposed abutments adapted successively to engage said follower to produce successive inward strokes of said tool supporting element relative to said work axis, and spring means for retracting said tool supporting element after each inward stroke thereof.

2. In a machine tool of the kind specified, a tool holder comprising a body having a pair of connected parts spaced apart along the axis of rotation of the work, one of said body parts being mounted detachably and non-rotatably on said tool carrier, the other of said body parts having an opening therein, a ring mounted in said opening for rotation about the axis of the work, a driver operably associated with said ring and projecting outwardly of said body parallel to but offset from the work axis, a tool supporting element disposed between said body parts and mounted slidably on said body for oscillatory movement towards and away from the axis of the work, a tool mounted detachably on said tool supporting element with its shank transverse to the work axis, a follower operably associated with said tool supporting element and extending into the interior of the ring at one side of said work axis, said ring being provided internally with a plurality of angularly spaced cam surfaces adapted successively to engage said follower to produce successive inward strokes of said tool supporting element relative to said work axis, and spring means for retracting said tool supporting element after each inward stroke thereof.

3. A tool holder for a machine tool for use in forming work of non-circular form and comprising in combination a body having a pair of spaced connected parts, one of said parts being adapted for detachable mounting on the tool carrier of the machine tool, the other of said body parts having an opening therein, a ring mounted rotatably in said opening, a driver operably associated with said ring, a tool supporting element disposed between said body parts and mounted slidably on said body for oscillatory movement towards and away from the axis of the work, said element being adapted detachably to carry a tool disposed between said body parts, a follower operably associated with said tool supporting element and extending into the interior of the ring at one side thereof, said ring being provided internally with a plurality of angularly disposed abutments adapted successively to engage said follower to produce successive inward strokes of said tool supporting element relative to said work axis, and spring means for retracting said tool supporting element after each inward stroke thereof.

4. A tool holder for a machine tool for use in forming work of non-circular form and comprising in combination a body having a pair of spaced connected parts, one of said parts having a spigot adapted for detachable mounting on the tool carrier of the machine tool, the other of said body parts having an opening therein, a ring mounted rotatably in said opening, a driver operably associated with said ring, a tool supporting element disposed between said body parts and mounted slidably on said body for oscillatory movement towards and away from the axis of the work, said element being adapted detachably to carry a tool disposed between said body parts, a follower operably associated with said tool supporting element and extending into the interior of the ring at one side thereof, said ring being provided internally with a plurality of angularly disposed abutments adapted successively to engage said follower to produce successive inward strokes of said tool supporting element relative to said work axis and spring means for retracting said tool supporting element after each inward stroke thereof.

5. In a capstan lathe, a tool holder comprising a body having a pair of connected parts spaced apart along the axis of rotation of the work, one of said body parts being mounted detachably and non-rotatably on said tool carrier, the other of said body parts having an opening therein, a ring mounted in said opening for rotation about the axis of the work, a driver operably associated with said ring, and projecting outwardly of said body parallel to but offset from the work axis, a tool supporting element disposed between said body parts and mounted slidably on said body for oscillatory movement towards and away from the axis of the work, a tool mounted detachably on said tool supporting element with its shank transverse to the work axis, a follower operably associated with said tool supporting element and extending into the interior of the ring at one side of said work axis, said ring being provided internally with a plurality of angularly spaced cam surfaces adapted successively to engage said follower to produce successive inward strokes of said tool supporting element relative to said work axis, and spring means for retracting said tool supporting element after each inward stroke thereof.

ARTHUR TREVENA.

REFERENCES CITED

The following references are of record in the file of this patent:

UNITED STATES PATENTS

| Number | Name | Date |
|--------|------|------|
| 473,027 | Smith | Apr. 19, 1892 |